March 31, 1959

L. R. KAHN 2,880,275

COMMUNICATION SYSTEM

Filed April 20, 1953

5 Sheets-Sheet 1

INVENTOR.
LEONARD R. KAHN

BY James and Franklin

ATTORNEYS

March 31, 1959 L. R. KAHN 2,880,275

COMMUNICATION SYSTEM

Filed April 20, 1953 5 Sheets-Sheet 2

INVENTOR.
LEONARD R. KAHN

BY James and Franklin

ATTORNEYS

INVENTOR.
LEONARD R. KAHN
BY James and Franklin
ATTORNEYS

INVENTOR.
LEONARD R. KAHN
BY James and Franklin
ATTORNEYS

March 31, 1959 L. R. KAHN 2,880,275

COMMUNICATION SYSTEM

Filed April 20, 1953 5 Sheets-Sheet 5

INVENTOR.
LEONARD R. KAHN
BY James and Franklin
ATTORNEYS 2,880,275

COMMUNICATION SYSTEM

Leonard R. Kahn, New York, N.Y.

Application April 20, 1953, Serial No. 349,736
6 Claims. (Cl. 179—15)

This invention relates to communication systems, and more particularly to such systems for the transmission of signals having frequency redundancy.

By "frequency redundancy" I mean that not all of the frequency components of the signal are required in order to transmit intelligence. The frequency range of the signal may be divided into a series of narrower bands, in which case it will be found that the transmission of only alternate bands is sufficient to transmit the desired intelligence. Similarly the transmission of the intermediate bands alone will convey the same intelligence.

One primary object of the present invention is to reduce the undesirable effects of fading when transmitting signals having frequency redundancy. A further object of the invention is to reduce the peak power requirements of the transmitter when transmitting such signals. A still further object is to provide some degree of privacy in the transmission of such signals. Still another object is to improve the signal-to-noise ratio.

To accomplish the foregoing objects the apparatus of my invention comprises a group of band pass filters (hereinafter called simply filters) to select spaced or alternate component signal frequency bands, and another group of filters to select the intermediate signal frequency bands. Both sets of bands are transmitted while maintaining a recognizable displacement between one set and the other. In one form of my invention this displacement is a time displacement obtained by delaying one set of bands relative to the other before transmitting both sets. In another form of the invention the two sets of bands are transmitted over separate carriers which differ in frequency, so that the maintained displacement is a displacement in carrier frequency, rather than a time displacement. Generally speaking, a time displacement is needed when only one communication channel is available, and is not needed when multiple communication channels are available. Either the time diversity or the frequency diversity helps reduce fading at the receiver.

If the displacement is a time displacement, the receiver includes a time delay unit which is used to delay the non-delayed set of bands by an amount corresponding to the delay before transmission, in order to bring the bands into registration, whereupon they are combined to reproduce the desired signal. The receiver also includes two groups of filters corresponding to those used at the transmitter.

If two channels are used for a single message it is not necessary to employ filters at the receiver. However, this would be wasteful of the available facilities, and it is therefore preferred to transmit two messages over the two channels, in which case the receiver is provided with groups of filters corresponding to those used at the transmitter. Time delay units are not essential. However, time delay units may be employed, even with two channels, with a view to reducing fading by time diversity as well as frequency diversity.

To accomplish the foregoing general objects, and other more specific objects which will hereinafter appear, my invention resides in the communication method and system, and the elements thereof, as are hereinafter more particularly described in the following specification. The specification is accompanied by drawings, in which.

Figure 1:
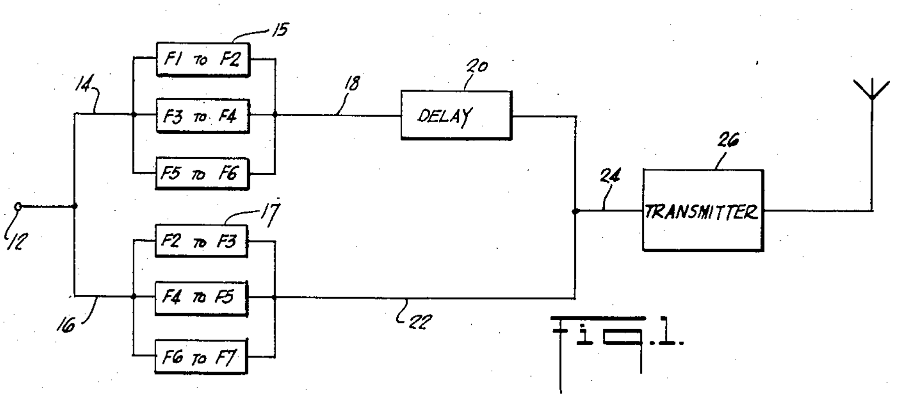
Fig. 1 is a schematic diagram for a transmitter embodying features of my invention.

Referring to Fig. 1, the signal, for example speech or music, may be supplied at 12. It is split into two paths 14 and 16. The path 14 has a series of alternate bandpass filters which split the audio spectrum into bands, here indicated as extending from F1 to F2, from F3 to F4, and from F5 to F6. The path 16 is led to a generally similar series of alternate bandpass filters which similarly split the audio spectrum into bands, but in this case the bands are the intermediate bands. Specifically, they extend from F2 to F3, from F4 to F5, and from F6 to F7.

Now the output of the first set of filters is supplied through path 18 to a delay unit 20 which delays the selected signal frequency components by a desired amount, which may be a few seconds. The intermediate components following path 22 are not delayed, and all of the bands are combined at 24 and fed into a transmitter 26 which in turn transmits a modulated carrier which is modulated by the displaced bands. It will be understood that the transmitter 26 may employ amplitude modulation, phase modulation, or frequency modulation, and that it may be a single sideband transmitter or a pulse-type transmitter, etc.

The two sets of filters together pass all the audio components of the signal. However, the components fed to the path 22 are not delayed and therefore reach the transmitter 26 before the components that are fed to the path 18. Thus the transmitter emits a signal which is modulated by spaced portions of the signal spectrum which are delayed, and also modulated by the intermediate spaced portions of the signal spectrum which are not delayed. The resulting signal, if received by conventional means, would sound as though there were a prohibitively large echo or multi-path effect, the echo being about as loud as the signal, and the signal therefore being rather difficult to understand, except by extreme mental concentration on the part of the listener, to mentally exclude one signal while listening to the other. The displacement between the two sets of bands is here a time displacement.

Figure 2:
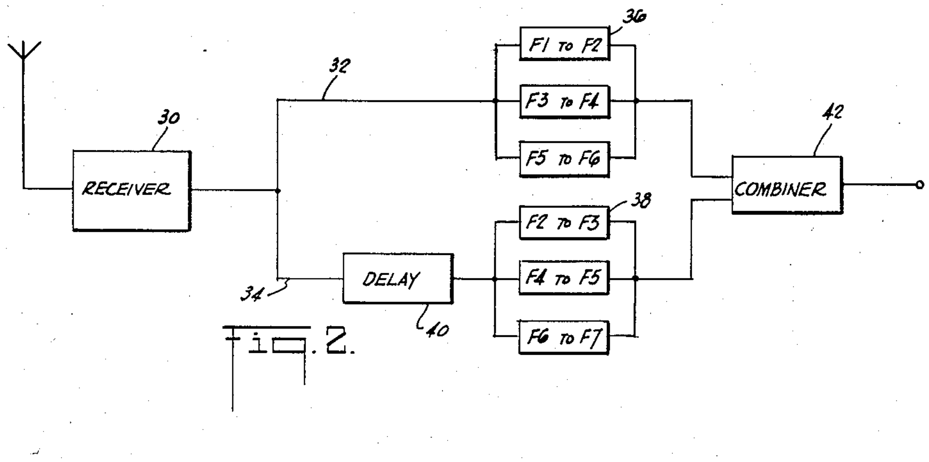
Fig. 2 illustrates a receiver to be used with the transmitter shown in Fig. 1.

Referring now to Fig. 2, I there show a block diagram of a receiving system for use with the transmitter of Fig. 1. The receiver 30 may be a conventional receiver (A.M., P.M., F.M., etc.) in which the received energy is demodulated to reproduce the audio or signal frequency. This audio signal is then divided as shown at 32 and 34. A group of filters 36 corresponds to the filters 15 shown in Fig. 1, while the group of filters 38 corresponds to the filters 17 shown in Fig. 1. Thus the signal is split into the same components as in the transmitter. The delay unit 40 corresponds to the delay unit 20 shown in Fig. 1 and is arranged to provide a similar delay, but the delay unit 40 is now in branch 34 rather than branch 32. Thus the spectrum components that had been previously delayed are now transmitted without delay, while the components which were not delayed in the transmitter are now delayed in the receiver. The resulting outputs are fed to a combiner 42 in which all of the signal frequency components are recombined in suitable registration, that is, in their proper temporal relationship.

Figure 3:
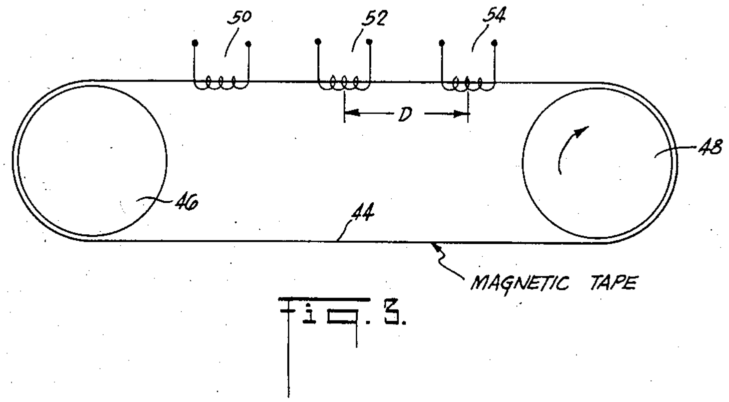
Fig. 3 is explanatory of one possible form of delay unit shown in Figs. 1 and 2.

Referring now to Fig. 3, the time delay unit may be a simple form of tape recorder using an endless loop of tape. Specifically, the endless loop 44 runs about spaced wheels oı pulleys 46 and 48, one of which—in this case the wheel 48—is driven by suitable driving means, preferably a synchronous motor drive. The tape is moved at a constant velocity and passes three magnetic heads 50, 52 and 54. The head 50 is an erase head which removes all previously recorded information as well as noise. The tape then moves past the recording head 52 which feeds in the information to be delayed. In Fig. 1 this would be the alternate frequency components from filters 15. In Fig. 2 it would be the signal frequency energy passing through the filters 38, it being understood that the delay unit 40 could be located after as well as ahead of the filters 38, although I prefer the latter arrangement, as shown. The head 54 in Fig. 3 is a playback head which picks up the delayed signal. The delay is a direct function of the distance D between the recording head 52 and the playback head 54, and is an inverse function of the velocity of the tape.

It may be mentioned that no special synchronizing signals are needed between the transmitter and the receiver. Any error or discrepancy in the speed of travel of the two tapes is not cumulative, and therefore is not critical. A slight error will correspond to a slight deviation from perfect registration, and this is either inaudible, or, if so great as to become an audible echo, is readily corrected by changing the speed of the tape at the receiver until the echo disappears.

Figure 4:
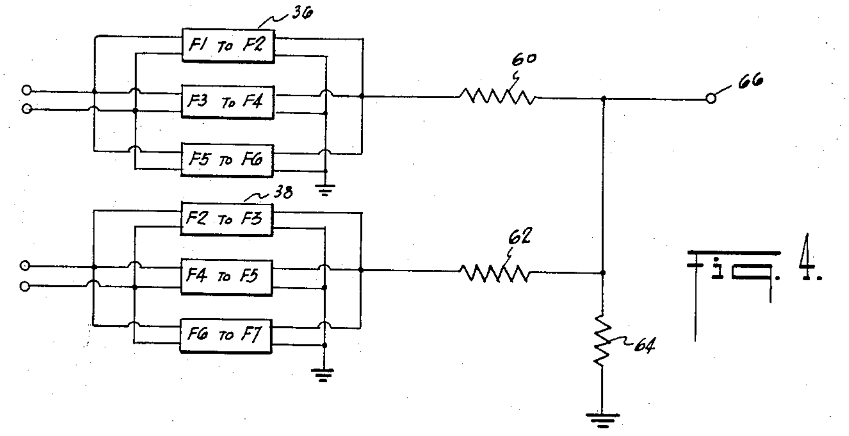
Fig. 4 shows a simple linear combiner which may be used in Fig. 2.

Referring now to Fig. 4, I there show a simple linear combiner in which the output from filter group 36 is fed through a resistor 60; the output from filter group 38 is fed through a resistor 62; and the two are connected to ground through a third resistor 64, the combined signal being available between terminal 66 and ground. The resistor 60, 62 and 64 may have a suitable high value, say one megohm.

Figure 5:
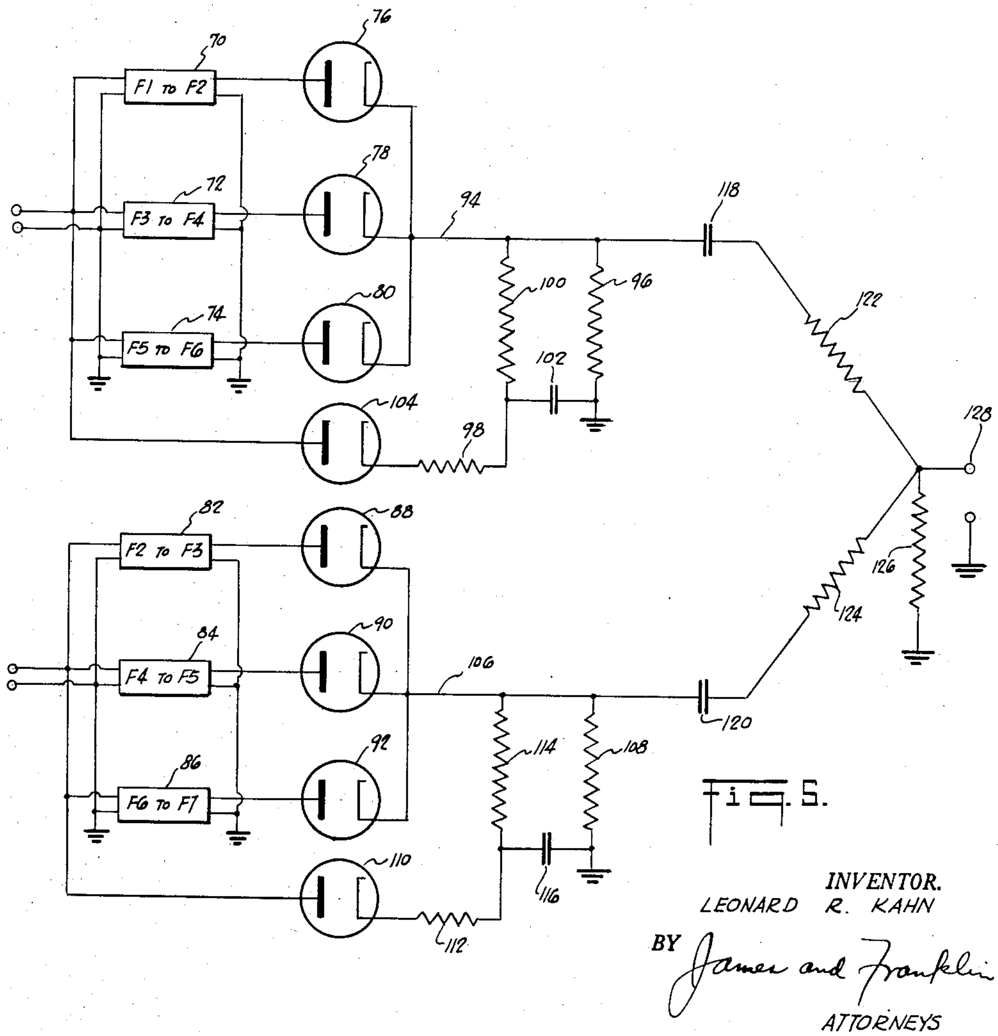
Fig. 5 illustrates a somewhat more complex combiner intended to improve the signal-to-noise ratio.

A more elaborate form of combiner is shown in Fig. 5. This is a non-linear combiner which improves the signal-to-noise ratio. The arrangement is such that the segments of signal spectrum pass through separate non-linear devices which pass them only when of high enough level. When there is no signal in a particular segment of the spectrum the diode opens and the noise in that particular segment of the spectrum is cut off. In other words, a gate action is provided which prevents transmission when ever the signal is below a desired level, thus eliminating noise in all segments where the signal level is poor, and so greatly improving the signal-to-noise ratio.

Considering the arrangement in greater detail, the alternate filters 70, 72 and 74 are connected to the plates of diodes 76, 78 and 80, respectively. The intermediate filters 82, 84 and 86 are connected to the plates of diodes 88, 90 and 92, respectively. The cathodes of the upper diodes are connected together at 94, and connected to a common load resistor 96. There is also a lowpass network composed of resistors 98 and 100 and capacitance 102. This network is fed by a diode 104 which receives the entire undelayed (at the receiver) signal, so that the direct current produced in the low-pass network is proportional to the level of the undelayed signal. The resulting D.C. voltage, suitably filtered and attenuated, is fed to the load resistor 96.

A generally similar circuit is provided for the delayed (at the receiver) signal, it being seen that the cathode of the diodes 88, 90 and 92 are combined at 106 and supplied to a load resistor 108, while the entire delayed signal is supplied to a diode 110 which is connected to a low-pass network made up of resistors 112 and 114 and a capacitance 116.

The circuit is in effect a common load switching arrangement which functions as follows: The D.C. derived from the diode 104 establishes a bias across the load resistor 96 which biases the diodes 76, 78 and 80 to cut-off. If there is enough signal level in a particular band-pass filter the cut-off bias of the diode associated with that filter is overcome, and a signal from that portion of the spectrum is obtained. At all other times the diodes act as gates to suppress noise. This is valuable because at one time or another the signal may use some and not other filters, and the noise from the unused filter is cut off. Moreover, a frequency diversity effect may be obtained even when the frequencies differ by only small amounts, such as the audio frequency differences between one filter and another, and here again noise is cut off from the faded components.

The resulting signals, with their improved signal-to-noise ratio, are combined or summated through a suitable isolation network composed of the condensers 118 and 120 and the resistors 122, 124 and 126, the combined signal being obtained between terminal 128 and ground, as shown. The Fig. 4 or Fig. 5 circuit may be used at 42 in Fig. 2.

The diversity effect of the system shown in Figs. 1 and 2 is due to the fact that a circuit may have poor transmission qualities at one instant, whereas the conditions may be all right an instant later. Therefore the probability that the signal will be poor at both the undelayed time and the delayed time is greatly reduced. It will also be understood that the amount of time delay may be varied from time to time, to meet different fading conditions. In the drawing the number of filters is minimized, to simplify the drawing. The preferred number is such as to make either signal intelligible without the other signal.

Another variation of the system is to send the complete audio signal spectrum over one channel of a twin channel single-sideband transmitter and the complete delayed audio spectrum over the other channel of the transmitter. At the receiver the audio derived from each of the sideband channels would be used in a diversity system. The advantage of this system is that the peak power requirements of the single-sideband transmitter would be appreciably reduced.

Figure 6:
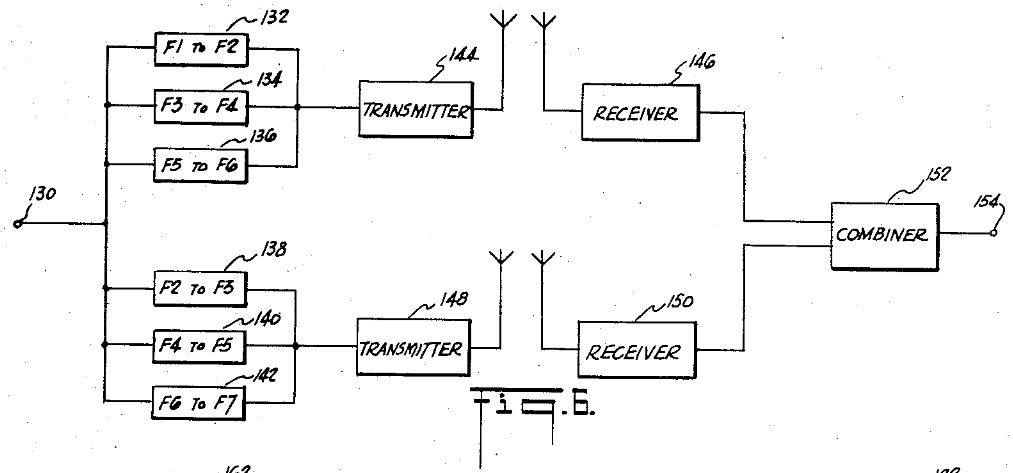
Fig. 6 is a block diagram explanatory of a form of my invention in which the maintained displacement between the two sets of signal frequency bands is a displacement in frequency rather than in time.

Referring now to Fig. 6, I there show a block diagram of a system in which two separate communications channels are used, thereby eliminating the necessity for time delay units. Thus the maintained displacement of the alternate and intermediate signal frequency components is a displacement in the transmission channel used, rather than a displacement in time over a single channel.

As in the other embodiments of the invention, the voice or other signal is split into a number of different frequency bands by means of groups of band pass filters. Thus the signal supplied at 130 is fed to filters 132, 134 and 136 forming one group, and filters 138, 140 and 142 forming another group. One group selects spaced or alternate frequency components, while the other selects the intermediate frequency components, as shown by the frequency ranges indicated on the drawing. The components of one set are combined and used to modulate a suitable transmitter 144, the signal from which is received by a suitable receiver 146. Filters corresponding to the filters 132, 134, 136 could be used after the receiver 146, but are not essential because of the radio frequency selectivity of the receiver 146.

Similarly the intermediate frequency components are used to modulate a transmitter 148, the output of which is received on a suitable receiver 150, which again could be followed by filters, but the filters are not necessary because of the radio frequency selectivity of the receiver 150. The transmitter carriers differ in frequency, the displacement here being one of frequency rather than time. The resulting signal frequency components are combined in a suitable combiner 152, which may be either a simple linear combiner, as in Fig. 4, or a non-linear combiner arranged to utilize whichever signal has a signal strength greater than a desired minimum. By using filters at the receivers one may use the combiner shown in Fig. 5. Thus the output at 154 from the non-linear combiner might be the signal from one channel alone, or from the other channel alone, or from both channels, or, using filters, from certain bands of either or both, depending on the signal level of the bands in the channels. In this way the signal-to-noise ratio may be improved by the action of the non-linear combiner.

The diversity effect here depends on the radio frequency difference rather than on a time difference, that is, it is based on the fact that at any one instant the fading on one radio frequency channel may be quite different from the fading on another channel having a different radio frequency. In brief there is frequency diversity rather than time diversity.

Figure 7:
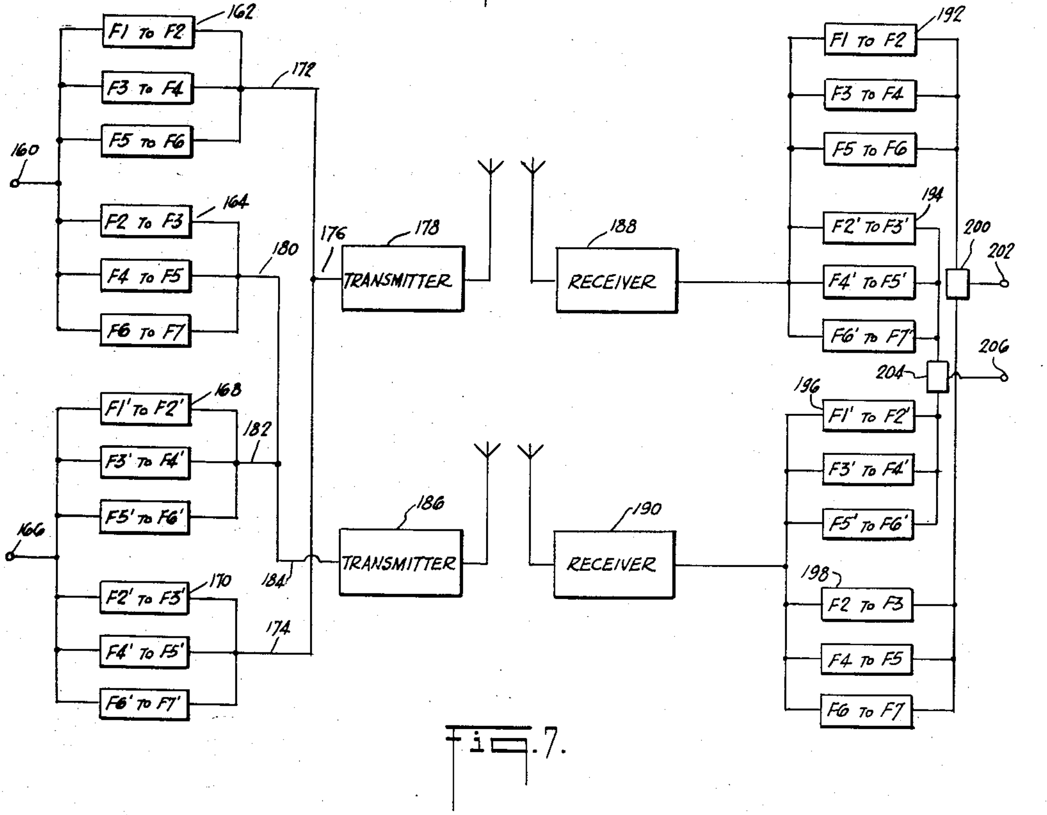
Fig. 7 is a block diagram showing how the benefits of my invention may be obtained while retaining the transmission of two messages over two channels.

The arrangement shown in Fig. 6 has eliminated the need for time delay units by using two transmission channels, but in practical installations it is evident that it would be considered uneconomic to employ two transmission channels for a single message. The arrangement of Fig. 7 shows how all of the advantages of the present invention may be retained while utilizing the two transmission channels for two messages. A first message is supplied at 160 and is broken into alternate frequency components by a filter group 162, and into intermediate frequency components by a filter group 164. A second message is supplied at 166 and is broken into alternate frequency components by means of a filter group 168, and intermediate frequency components by a filter group 170. The outputs of filters 162 are combined at 172, and the outputs of filters 170 are combined at 174, and these are in turn combined at 176, and then used to modulate a transmitter 178. Thus the first channel is used to transmit the alternate frequency components of the first message, and the intermediate frequency components of the second message.

Similarly the outputs of the filters 164 are combined at 180, the outputs of the filters 168 are combined at 182, and these are in turn combined at 184, and then used to modulate a transmitter 186. Thus the second channel is used for the alternate frequency components of the second message and the intermediate frequency components of the first message.

The channels have corresponding receivers 188 and 190, which in turn are connected to groups of filters 192, 194, 196 and 198. These are marked on the drawing to show how they correspond to the filter groups at the transmitters, and it will be seen that the alternate frequency components from filters 192 are combined with the intermediate frequency components from filters 198, thus bringing together at combiner 200 the alternate and intermediate components of the first message, made available at 202, although they were transmitted over two different channels. Similarly the alternate frequency components from filters 196 and the intermediate frequency components from filters 194 are combined at 204, thus reproducing the second message at 206, although the components were transmitted over two different channels.

The two channels may be in separate systems, or may be separate channels in a single-sideband twin channel or other multiplex system. By single-sideband twin-channel system I mean a system in which different information is transmitted on the upper and lower sidebands derived from a single modulated carrier. In relation to the more elemental system described with reference to Fig. 6, it will be seen that the empty or wasted frequency spaces are utilized by sending a second message through the empty spaces. In this manner the entire frequency capabilities of the two communication channels are utilized. Inasmuch as the characteristics of the channels would normally be different, the benefit of a diversity system is obtained, for when one channel is providing poor reception the other channel would normally be operating better and would satisfactorily transmit the desired information. Apart from the matter of diversity reception to reduce the effect of fading, the invention has an important advantage in reducing the peak power requirements of the transmitter. In the system of Fig. 7 the two messages are unlikely to peak at the same time.

In the arrangement of Fig. 1 the peak of the intermediate frequency components is delayed to a different time from the peak of the alternate frequency components, thus tending to level out the power requirement. The advantage of reduced peak power requirement would apply even to transmission systems which do not have a fading problem.

Figure 8:
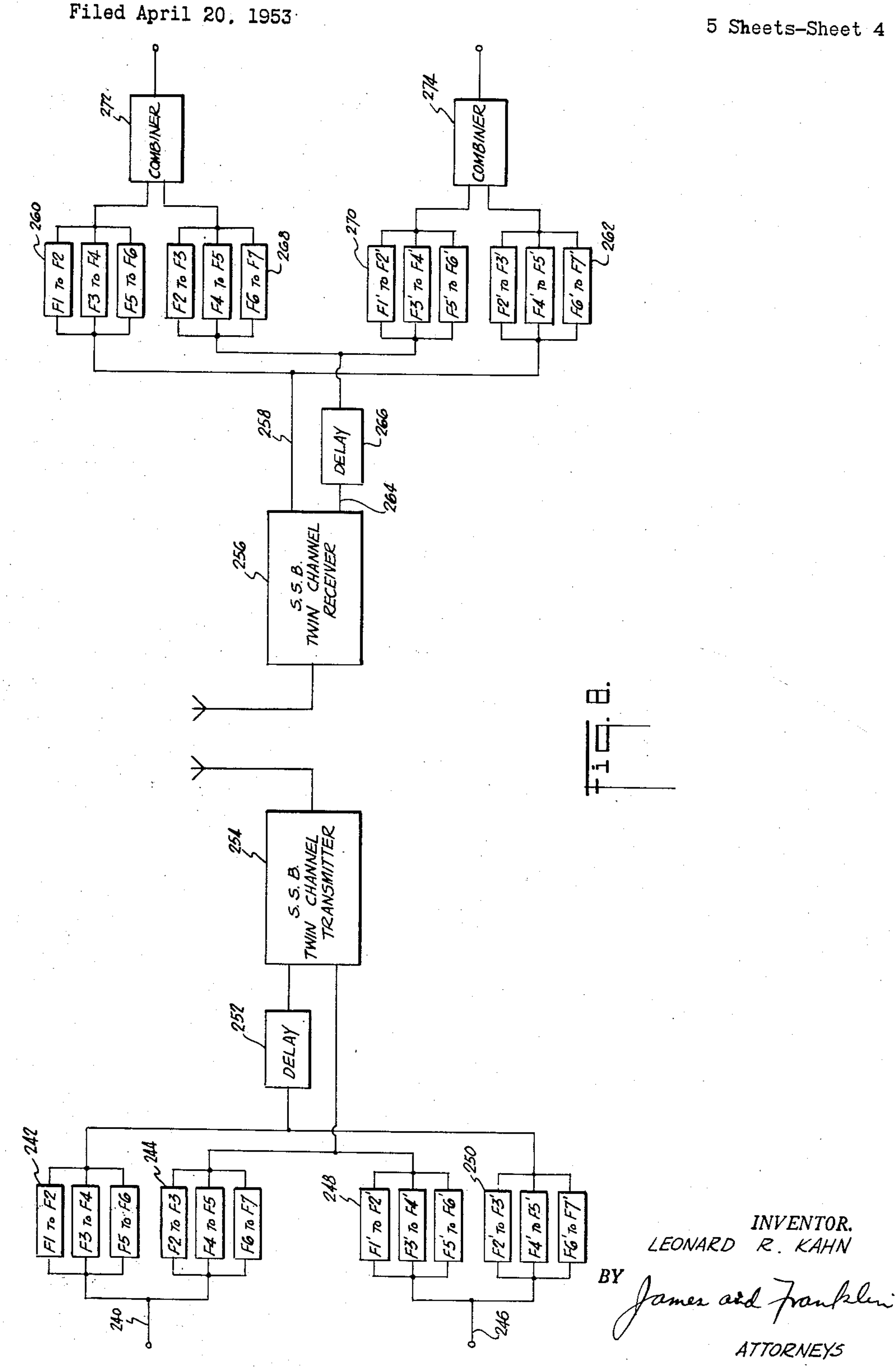
Fig. 8 shows the use of both two channels and time delay.

Referring now to Fig. 8, this circuit is somewhat like that of Fig. 7, except for two main changes. One is the use of time delay, in addition to using two channels for two messages. The other is the use of a common facility for the two channels, in this case a single sideband twin channel transmitter and receiver, instead of separate transmitters and receivers.

In Fig. 8, the first message is supplied at 240 and is broken into frequency components by a first filter group 242 and a second filter group 244. The second message is supplied at 246 and is broken into frequency components by a first filter group 248 and a second filter group 250. The filter groups 242 and 250 are connected to a delay unit 252 and then to one channel of a single sideband twin channel transmitter 254. The frequency components from the filter groups 244 and 248 are connected to the other channel of the transmitter 254.

The transmitted energy is received on a single sideband twin channel receiver 256. The output from one channel is connected at 258 to filter groups 260 and 262 which correspond to the filter groups 242 and 250 at the transmitter. The output from the other channel of the receiver is supplied at 264 to a delay unit 266 and thence to the filter groups 268 and 270. It will be understood that the delay in unit 266 corresponds to the delay in unit 252 at the transmitter, but that the delay is now introduced into that channel which was not delayed at the transmitter. The frequency components selected by filter groups 260 and 268 are thus brought into temporal registration, and are combined in a suitable combiner 272 from which the re-assembled first message is obtained. Similarly, the outputs of the filter groups 270 and 262 are now in temporal registration and are combined in a suitable combiner 274 from which the second message is obtained. The combiners may be linear or non-linear, as previously explained.

It will be seen that with this arrangement some diversity effect is obtained because of frequency difference, there being an appreciable difference in frequency between the upper and the lower sidebands of the two channels. There is also time diversity because of the delay unit. There is a leveling of peak power requirement because of the time delay, and this is significant when both messages go through a single facility, which in this case is the amplifier of the twin channel transmitter. It will thus be seen that the benefits of both time diversity and frequency diversity may be obtained in a single installation.

Both the diversity effect and the leveling of peak power may be increased by splitting the signal spectrum into three portions and transmitting these at three different times. Similarly, this splitting up and transmitting at different periods could be increased to any desired number of times, although the cost of the equipment would correspondingly increase.

Figure 9:
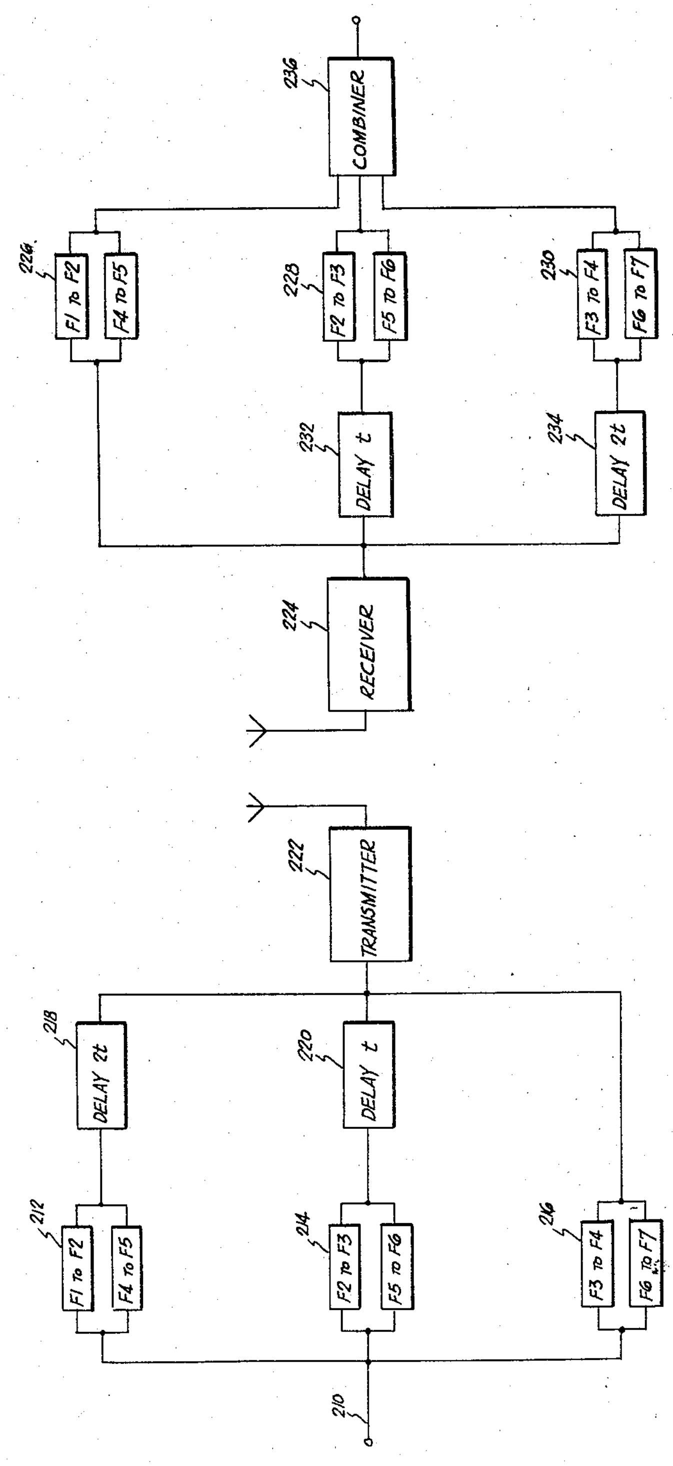
Fig. 9 is a block diagram like Figs. 1 and 2 but showing division into three sets of frequency bands.

The use of three portions is illustrated in Fig. 9, in which the signal supplied at 210 is fed to a first filter group 212, a second filter group 214, and a third filter group 216. Each group is made up of band-pass filters of different frequencies, which preferably interleave as indicated. The frequency components selected at 212 pass through a delay unit 218, while the frequency components selected at 214 pass through a delay unit 220 which provides half the delay of the unit 218. The components selected at 216 are not delayed. The outputs are supplied to a transmitter 222, and received by a receiver 224. This, in turn, leads to filter groups 226, 228 and 230, corresponding to the filter groups at the transmitter. There are also delay units 232 and 234 which correspond, respectively, to the delay units 220 and 218 at the transmitter. Thus, the signal components are all brought into temporal registration, and may be combined in a suitable combiner 236 of either linear or non-linear type.

By way of example, it may be stated that in Fig. 1 a speech spectrum of from say 300 to 3300 cycles may be broken into ten bands of 300 cycles each, five being delayed, and five not. The bands are preferably equal, or nearly equal, and those at the receiver should equal the corresponding ones at the transmitter. The delay may be from a tenth of a second to several seconds. In the non-linear combiner of Fig. 5 the resistors 96 and 100 may be 10,000 ohms; the resistor 98 may be in a range of from 20,000 to 200,000 ohms; the condenser 102 may be 0.5 mfd.; the condenser 118 may be 0.01 mfd.; and the resistors 122, 124, and 126 may be one megohm each. The values in the lower branch are the same as in the upper branch. All these quantitative values are mentioned solely by way of example, and not in limitation of the invention. The diodes are not critical and may be tubes, selenium rectifiers, germanium diodes, etc.

It is believed that the method and apparatus of my invention, as well as the advantages of the same, will be apparent from the foregoing detailed description. I provide diversity without requiring added radio frequency spectrum. My diversity system is a relatively inexpensive one because it does not require a multiplicity of antenna systems, receivers or transmitters, greater than the number of messages handled. My system has the added advantage of reducing the peak power requirement of the transmitter, and therefore reduces the size of the required transmitter. There is also some degree of privacy.

It will be understood that while I have shown and described my invention in a preferred form, changes may be made without departing from the scope of the invention, as sought to be defined in the following claims. In the claims the reference to combining the signal frequency bands at the receiver is intended to apply to either simpler linear combining, as in Fig. 4, or non-linear combining with a gate effect, as in Fig. 5. In other words, the combining of the signal frequency bands is not intended to exclude the possibility of selecting and utilizing whichever bands or set of bands has the greater signal strength, or a signal strength greater than a desired minimum. For brevity the term "filter" is used, although it will be understood that the filter units are actually bandpass filters. The reference to alternate bands and intermediate bands is not intended to exclude subdivision into three or more sets, as shown in Fig. 9. The reference to modulating a first carrier channel and a second carrier channel is not intended to exclude the separated upper and lower side-bands of a single side-band twin channel system, or indeed other known multiplex systems. The reference to maintaining a recognizable displacement is intended to include time displacement, and carrier frequency displacement, and other known forms of channel separation and multiplexing.

I claim:

1. Apparatus for improving the communication of intelligence by signals having frequency redundancy, said apparatus comprising means to subdivide the signal into a substantial number of narrow component signal frequency bands, means to select alternate ones of said bands to provide a first set of bands sufficient for transmission of the intelligence without the remaining intermediate bands, means for selecting the said intermediate bands to provide a second set of bands sufficient for transmission of the intelligence without the aforesaid alternate bands, means to uniformly time delay one set of bands relative to the other by a tenth of a second or more, means to transmit both sets of bands, means to receive and select the set of alternate bands, means to receive and select the set of intermediate bands, means to relatively time delay the non-delayed set by a uniform amount corresponding to the delay before transmission of the delayed set in order to bring the bands into temporal registration, and means to combine the bands in order to provide the desired signal.

2. Apparatus for improving the communication of intelligence by signals having frequency redundancy, said apparatus comprising means to subdivide the signal into a substantial number of narrow component signal frequency bands, means to select alternate ones of said bands to provide a first set of bands sufficient for transmission of the intelligence without the remaining intermediate bands, means for selecting the said intermediate bands to provide a second set of bands sufficient for the transmission of the intelligence without the aforesaid alternate bands, means to uniformly time delay one set of bands relative to the other by a tenth of a second or more and to modulate a carrier by said sets of bands and to transmit the modulated carrier, means to receive and demodulate the carrier, means to select the set of alternate bands, means to select the set of intermediate bands, means to relatively time delay the non-delayed set by a uniform amount corresponding to the delay before transmission of the delayed set in order to bring the bands into temporal registration, and means to combine the bands in order to provide the desired signal.

3. Apparatus for improved communication of intelligence by means of signals having frequency redundancy, said apparatus comprising a substantial number of filters to subdivide the signal into a substantial number of narrow component signal frequency bands, including a first group of filters to select alternate ones of said bands to provide a first set of bands sufficient for transmission of the signal intelligence without the remaining intermediate bands, a second group of different frequency filters to select the said intermediate bands to provide a second set of bands sufficient for transmission of the signal intelligence without the aforesaid alternate bands, a time delay unit for uniformly delaying one set of filtered bands relative to the other by a tenth of a second or more, means to transmit both sets of bands, receiver means for receiving and selecting the first set of bands, and for receiving and selecting the second set of bands, a delay unit for time delaying the non-delayed set by a uniform amount corresponding to the delay before transmission of the delayed set in order to bring the bands into temporal registration, and means to combine the sets to reproduce the signal.

4. Apparatus for improved communication of intelligence by means of signals having frequency redundancy, said apparatus comprising a substantial number of filters to subdivide the signal into a substantial number of narrow component signal frequency bands, including a first group of filters to select alternate ones of said bands to provide a first set of bands sufficient for transmission of the signal remaining intelligence without the intermediate bands, and a second group of different frequency filters to select the said intermediate bands to provide a second set of bands sufficient for transmission of the signal intelligence without the aforesaid alternate bands, a time delay unit for uniformly delaying one set of filtered bands relative to the other by a tenth of a second or more, a transmitter including means to modulate a carrier by both sets of bands, a receiver for receiving and demodulating the carrier, a first group of filters to select the first set of bands, a second group of filters to select the second set of bands, a delay unit for time delaying the non-delayed set by a uniform amount corresponding to the delay before transmission of the delayed set in order to bring the bands into temporal registration, and means to combine the sets to reproduce the signal.

5. Apparatus for improved transmission of intelligence by means of signals having frequency redundancy, said apparatus comprising a substantial number of filters to subdivide the signal into a substantial number of narrow component signal frequency bands, including a first group of filters to select alternate ones of said bands to provide a first set of bands sufficient for transmission of the signal intelligence without the remaining intermediate bands, and a second group of different frequency filters to select the said intermediate bands to provide a second set of bands sufficient for transmission of the signal intelligence without the aforesaid alternate bands, a time delay unit for uniformly delaying one set of filtered bands relative to the other by a tenth of a second or more, and means to transmit both sets of signal frequency bands.

6. Apparatus for improved reception of signals having frequency redundancy which are transmitted in two sets of component signal frequency bands, one entire set of which is uniformly delayed relative to the other by a tenth of a second or more, and one set having alternate ones of said bands and being sufficient for transmission of the signal intelligence without the remaining intermediate bands and another set having said intermediate bands and being sufficient for transmission of the signal intelligence without the aforesaid alternate bands, said apparatus comprising means for receiving the bands, a group of filters for selecting one of the aforesaid sets of bands, a group of filters for selecting the other of the aforesaid sets of bands, a time delay unit for time delaying the non-delayed set by a uniform amount which is a tenth of a second or more and which corresponds to the delay before transmission of the delayed set in order to bring the bands into temporal registration, and a combining means to combine the sets in order to reproduce the signal.

References Cited in the file of this patent

UNITED STATES PATENTS

| | | |
|---|---|---|
| 1,542,566 | Mathes | June 16, 1925 |
| 1,565,521 | Stone et al. | Dec. 15, 1925 |
| 1,573,983 | Mathes | Feb. 23, 1926 |
| 2,269,295 | Vadersen | Jan. 6, 1942 |
| 2,389,356 | Goldstine | Nov. 20, 1945 |
| 2,417,069 | Farkas | Mar. 11, 1947 |